J. SHANNON.
Grain Drill.
No. 36,535.
2 Sheets—Sheet 1.
Patented Sept. 23, 1862.
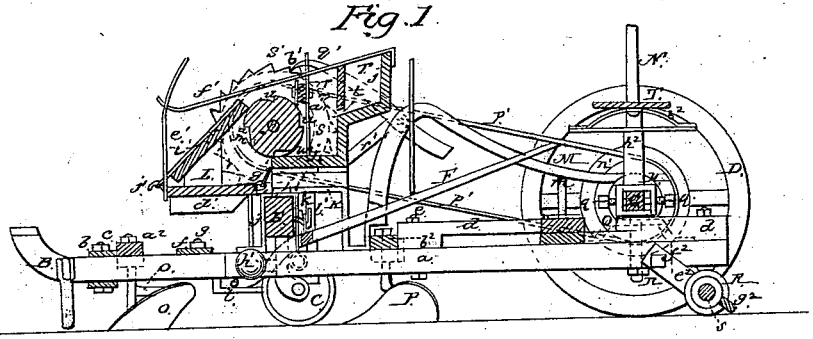
Witnesses:
James R. Gridley
Charles Smith
Inventor:
Jackson Shannon
per Munn & Co., Attorney J. SHANNON.
Grain Drill.

No. 36,535.

2 Sheets—Sheet 2.

Patented Sept. 23, 1862.

Witnesses:
James R. Gridley
Charles Smith

Inventor:
Jackson Shannon
per Munn & Co.
attys

UNITED STATES PATENT OFFICE.

JACKSON SHANNON, OF FREEPORT, ILLINOIS.

IMPROVEMENT IN SEEDING-MACHINES.

Specification forming part of Letters Patent No. 36,535, dated September 23, 1862.

*To all whom it may concern:*

Be it known that I, JACKSON SHANNON, of Freeport, in the county of Stephenson and State of Illinois, have invented a new and Improved Seeding-Machine; and I do hereby declare that the following is a full, clear, and exact description of the same, reference being had to the accompanying drawings, forming a part of this specification, in which—

Figure 3:
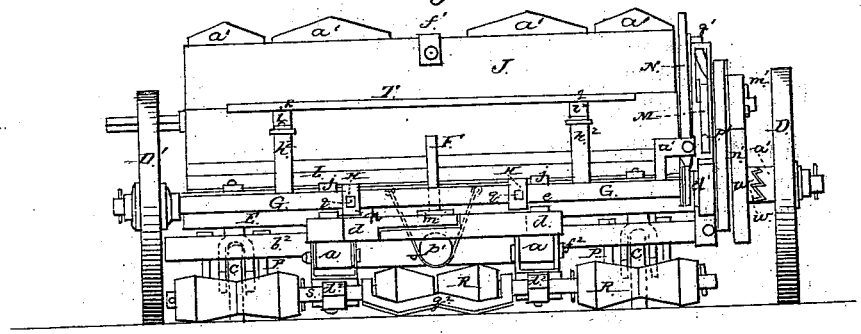
Figure 4:
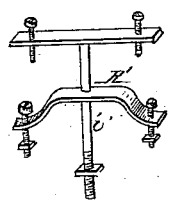
Figure 5:
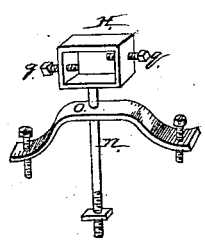
Figure 6:
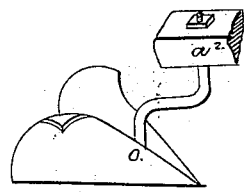
Figure 7:
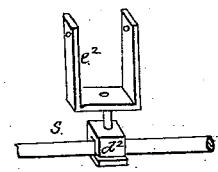

Figure 1 represents a longitudinal vertical section of my invention. Fig. 2 is a plan or top view of the same. Fig. 3 is a rear elevation of the same. Figs. 4, 5, 6, and 7 are detached perspective views of different parts of my invention.

Similar letters of reference indicate corresponding parts in the several figures.

The frame A, to which the several parts of my machine are attached, consists of two beams, *a a*, which are connected in front by a cross-bar, *b*, fastened to said beams by means of screw-bolts *c* and in the rear by the diagonal expansion-bars *d*, which are secured to the beams by screw-bolts *e*. An additional cross-bar, *f*, with curved slots, serves to steady the frame A and to retain the draft-bar B, the rear end of which is secured to the cross-bar *f* by means of a screw-bolt, *g*, while it is secured in front by a screw-bolt, *h*, passing through the cross-bar *b*.

The frame A is supported in front by two caster-wheels, C, and in the rear by two wheels, D D'. The caster-wheels C are attached to a cross-bar, E, which is connected to the beams *a* by means of boxes or guides *j*, and to which a motion in a vertical direction can be imparted by a hand-lever, F. This lever is attached to the cross-bar E by means of a hook and eye, *k*, and its front end is forked and curved down so as to catch under the beams *a*, where said forked ends are retained and guided by hooks *l*, as clearly shown in Fig. 1. By this lever the depth to which the seed is deposited into the ground is regulated; and by depressing the rear end of the lever F the cross-bar E is also depressed, and consequently the frame A is raised so as to throw the working parts out of the ground when it is desired to turn the machine or whenever it is desirable to move the machine along without operating on the ground. When thus depressed the rear end of the lever F catches under a hook, *m*, which rises from the expansion-bars *d*.

The hind wheels, D D', are secured to and turn loosely on the ends of the axle G, which passes through and is firmly retained by boxes H, that are secured by means of screw-bolts *n* to the beams *a*. Said boxes (see Fig. 5) are supported by benches *o*, and they can be raised or lowered by a suitable lever or levers or by any other desirable means. By this operation the frame is lowered or raised and the depth to which the seed is deposited and covered is regulated. If a lever is employed for the purpose of adjusting the height of the axle G, said lever may also be so arranged that its end catches under the hook *m*, and that the rear end of the frame A can be permanently suspended from said lever when it is desired to turn the machine or to move it from one field to another. Set-screws *q*, passing sidewise through the boxes H, serve to regulate the position of axle G in a horizontal direction for the purpose of tightening the belt which gives motion to the seed-roller, and also for the purpose of adjusting the position of the wheels D D'.

The hopper J is divided into five (more or less) compartments or seed-boxes, *r*, and another set of compartments, *s*, which communicate with the seed-boxes *r* by openings *t*, (see Fig. 1,) and from which the seed passes into the seed and corn cells *u v w* on the surface of the roller K. Cut-offs or gates *a'* serve to regulate or interrupt the communication between the compartments *s* and the seed-cells. The seed cells *u* are cut into the surface of the roller K sufficiently large to suit different grains, and they, as well as the corn-cells *v w*, have three beveled edges, so that they may fill more readily. The corn-cells *v w* are cut into small metal plates fastened to the surface of the roller K, the plates on one side having one cell, *v*, which is used for drilling corn, and the plates on the opposite side having four cells, *w*, for the purpose of dropping corn in check. Either set of cells can be brought in operation by opening the corresponding gate. The surplus grain or corn is brushed back by brushes *b'*, secured to a cross-bar, *c'*.

By the revolutions of the seed-roller K the grain is thrown on the distributing-board L, one side of which is smooth for the purpose of sowing broadcast, while its other side is provided with partitions *d'* for the purpose of distributing grain in drill. Said distributing-board L is suspended from a bar or chain, *e'*, hooked on an arm, $f'$, which extends from the middle of top edge of the hopper and from a hook and eye, $g'$, projecting from the center of the lower front edge of the hopper-bottom. By means of the bar $e'$ the distributing-board can be set to a higher or lower grade to suit different kinds of grain, and by unhooking it it can be reversed, so as to bring either surface on the top. A weight, $h'$, which is attached to the under side of the distributing-board L, serves to keep the same level upon different grades of ground. The grain, in falling from the roller K on the distributing-board L, is protected from the wind by an apron, $i'$, which is secured to the front edge of said board by means of hooks $j'$.

The hopper J is supported by benches $k'$ and screw-bolts $l'$, (see Fig. 4,) which are secured to the beams $a$, and which can be readily taken off for the purpose of changing or reversing the hopper. For the purpose of planting corn the box should be placed so that the roller K faces the driver, whereas for sowing wheat or small grain the hopper is brought in the position represented in the drawings.

The seed-roller K receives its motion by means of cone-pulleys $m'$ $n'$ and a belt, $p'$; or, if it is desired to work it by hand, a lever, M, is used, which carries two pawls, $q'$ $r'$, acting from opposite sides on the ratchet-wheel $s'$. By giving an oscillating motion to the lever M a continuous rotary motion is imparted to the seed-roller, and the corn or grain can be deposited with any desired speed.

The pulley $m'$ is firmly secured to the end of the axle $t'$, to which the roller K is attached, and the pulley $n'$ turns loosely on the axle G of the wheels D D', in close proximity to the wheel D. A longitudinal motion is imparted to it by a lever, N, which is fulcrated in a standard, $u'$, rising from the axle G, the forked end of which catches into a groove, $v'$, turned into the hub of the pulley $n'$. From the opposite end of said pulley a clutch, $w'$, extends, which, by moving said pulley toward the wheel D, catches into a corresponding clutch, $x'$, on the inner end of the hub of the wheel D. By the action of the forked lever N, therefore, the pulley $n'$ can be thrown in or out of gear, as may be desired. The speed of the seed-roller K is regulated by shifting the belt on the various speeds of the cone-pulleys $m'$ $n'$, and the belt is tightened or loosened by means of the set-screws $q$ in the boxes H.

To the front part of the frame A a cross-bar, $a^2$, is secured, to which the small caster-shank plows or cultivator-teeth O are attached that are used for the purpose of opening the furrows for drilling grain. Another set of small caster-shank double-mold-board plows, P, are fastened to a cross-bar, $b^2$, behind the hopper and in the middle of the frame A. These plows are used for the purpose of covering the grain.

To the ends of the bar $b^2$ mold-board and landside caster-shank plows may be attached for the purpose of making the draft lighter and to cover the outside rows when planted in drills.

Three double-cone covering and smoothing rollers, R, are secured to the rear ends of the beams $a$ $a$, formed so that the bevels on the inside are larger than those on the outside, the middle roller being in two pieces so as to have the machine turn with more ease. These rollers turn loosely on the axle S, which is secured in boxes $d^2$, (see Fig. 7,) that are attached by means of a swivel to the hangers $e^2$, which are suspended from bolts $f^2$, passing through the ends of the beams $a$. The object of these swivels is to give to the axle S full play while the machine is passing over rough ground. The double-cone rollers R are cleaned and prevented from clogging by the action of scrapers $g^2$, which are suspended from the axle S.

T is the driver's seat, which is supported by standards $h^2$, rising from the axle G of the wheels D D', and which rests on springs $v^2$ to ease the motion. From this seat the several levers which serve to raise or lower the machine or to throw it in or out of gear are operated.

Having thus fully described my invention, what I claim as new, and desire to secure by Letters Patent, is—

1. The arrangement of the vertically-sliding bar E and vertically-adjustable axle G, in combination with the caster-wheels C, wheels D D', and frame A, all constructed and operating as shown and described.

2. The arrangement of the balance-weight $h'$, in combination with the distributing-board L, as and for the purpose described.

3. The arrangement and combination of the swivel-boxes $d^2$, hangers $e^2$, axle S, and conical rollers R, as and for the purpose specified.

JACKSON SHANNON.

Witnesses:
J. G. KINNEY,
ROBERT B. CARR.